(12) United States Patent
Hammann et al.

(10) Patent No.: US 9,351,181 B2
(45) Date of Patent: May 24, 2016

(54) SYSTEM MONITORING AND MANAGEMENT

(71) Applicant: Ombitron, Inc., Seattle, WA (US)

(72) Inventors: Harold Paul Hammann, Seattle, WA (US); Ian Johnson, North Bend, WA (US)

(73) Assignee: Ombitron Inc., Seattle, WA (US)

( * ) Notice: Subject to any disclaimer, the term of this patent is extended or adjusted under 35 U.S.C. 154(b) by 299 days.

(21) Appl. No.: 13/937,583

(22) Filed: Jul. 9, 2013

(65) Prior Publication Data

US 2015/0016270 A1 Jan. 15, 2015

(51) Int. Cl.
*H04W 24/04* (2009.01)
*H04W 4/00* (2009.01)
*H04L 12/26* (2006.01)
*H04L 12/64* (2006.01)

(52) U.S. Cl.
CPC ............ *H04W 24/04* (2013.01); *H04L 12/6418* (2013.01); *H04L 43/0817* (2013.01); *H04W 4/005* (2013.01)

(58) Field of Classification Search
CPC .. H04W 40/24; H04W 40/246; H04W 40/248
See application file for complete search history.

(56) References Cited

U.S. PATENT DOCUMENTS

| | | | | |
|---|---|---|---|---|
| 2005/0108389 A1* | 5/2005 | Kempin | ............ | H04L 43/0811 709/224 |
| 2008/0026747 A1* | 1/2008 | Navarro | ............... | H04W 16/12 455/426.1 |
| 2009/0113244 A1* | 4/2009 | Doshi | .................. | H04W 24/08 714/25 |
| 2012/0254944 A1* | 10/2012 | Kamat et al. | ..................... | 726/3 |

* cited by examiner

*Primary Examiner* — Anh Ngoc Nguyen
(74) *Attorney, Agent, or Firm* — Sheppard, Mullin, Richter & Hampton LLP

(57) ABSTRACT

Systems for monitoring and managing devices within a monitored system are described. The system can include a gateway device that is connected to the monitored system and configured to determine whether or not it remains connected to the monitored system. The gateway device is coupled to a network and can function to collect data about the monitored and manage devices within the monitored system and send the collected data over the network. The gateway device can also function to manage a managed device within the monitored system by controlling the functioning of the managed device. The gateway device can generate instructions for managing the managed device or receive instructions for managing the managed device over the network.

18 Claims, 7 Drawing Sheets

SYSTEM MONITORING AND MANAGEMENT

BACKGROUND

As telecommunication and network technology has continued to advance, people can access large amount of data at improved speeds. Additionally, as wireless network technologies have continued to advance people can access large amount of data at improved speeds in further remote locations around the world. Specifically, cellular networks have continued to advance to provide data to users at faster speeds over wide area ranges. For example, cellular networks have evolved from the 2G technology standard, to the 2.5G technology standard, to the 3G technology standard and now the 4G technology standard.

While network technology has improved in providing data to a user, networks have not been fully configured to monitor and manage devices efficiently. In particular networks have not been adapted to monitor and manage devices without user control or input. There therefore exists a need to provide improved network systems for monitoring and managing devices. Other limitations of the relevant art will become apparent to those of skill in the art upon a reading of the specification and a study of the drawings.

The foregoing examples of the related art and limitations related therewith are intended to be illustrative and not exclusive. Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations, one or more of the above-described problems have been addressed, while other implementations are directed to other improvements.

Various implementations include systems for monitoring devices within a monitored system. Specifically, devices within the monitored system can be connected to a gateway device. The gateway device can be coupled to a network and configured to determine whether the gateway device, itself, is connected to the monitored system. The gateway device can receive and/or generate monitored device data of any of the devices within the system. The received and/or generated monitored device data can be collected from the gateway device over the network coupled to the gateway device.

These and other advantages will become apparent to those skilled in the relevant art upon a reading of the following descriptions and a study of the several examples of the drawings.

DETAILED DESCRIPTION

Figure 1:
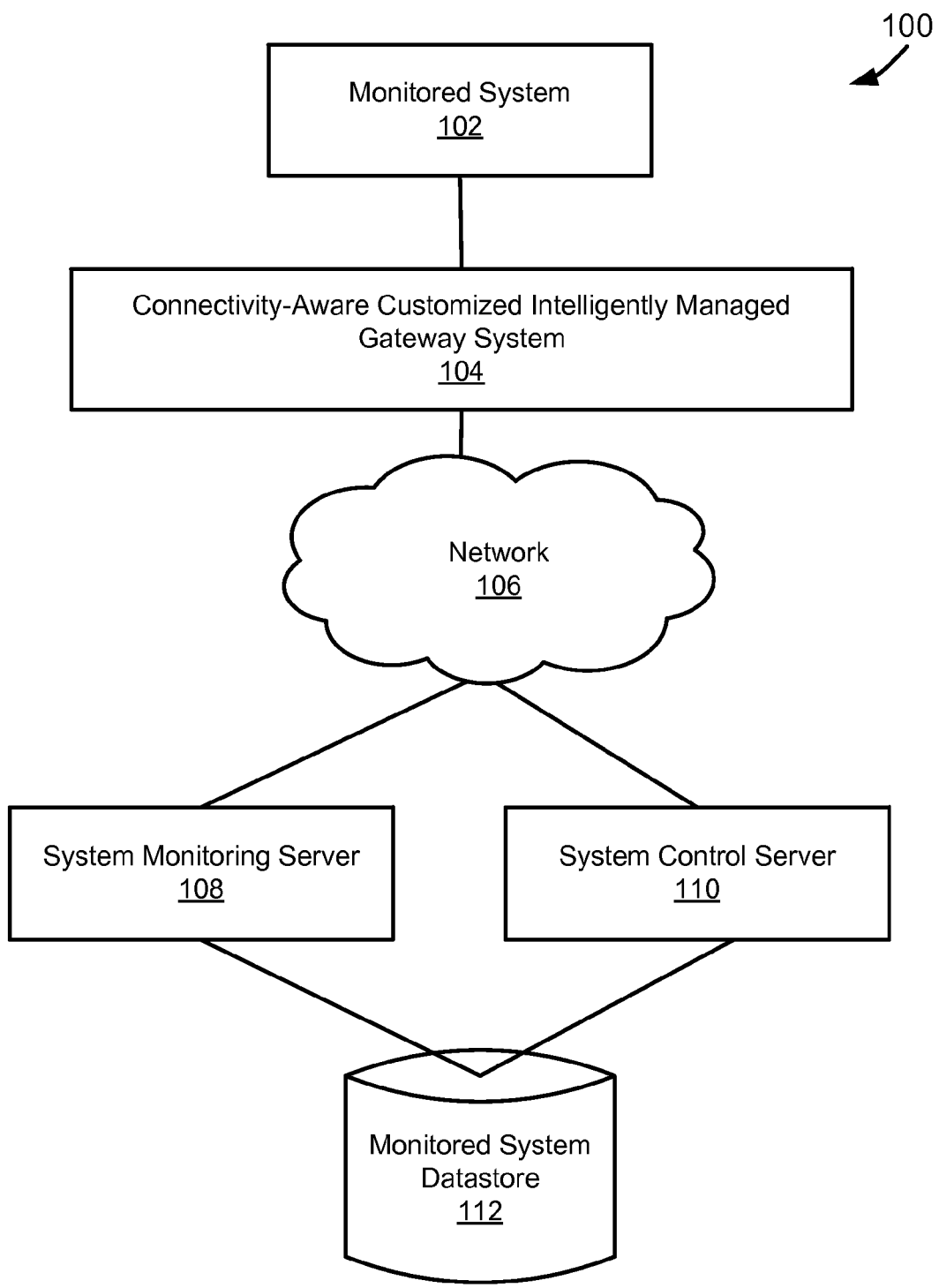
FIG. 1 depicts a diagram of an example of a system for monitoring a system.

FIG. 1 depicts a diagram 100 of an example of a system for monitoring a system. In the example of FIG. 1, the diagram 100 includes a monitored system 102, a connectivity-aware customized intelligently managed gateway system 104, a network 106, a system monitoring server 108, a system control server 110, and a monitored system datastore 112. As used in this paper, a system can be implemented as an engine or a plurality of engines. An engine, as used in this paper, includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor.

Systems described in this paper can include cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, cloud-based engines can execute functionalities and/or modules that end users access through a web browser or container application without having the functionalities and/or modules installed locally on the end-users' computing devices.

The monitored system 102 is coupled to the connectivity-aware customized intelligently managed gateway system 104. The monitored system 102 can include multiple monitored devices. Furthermore, as will be discussed in greater detail later, the monitored system 102 can include multiple managed devices. The monitored devices and/or managed devices can be implemented as part of a computer system and/or can include computer systems.

The monitored system 102 is coupled by the connectivity-aware customized intelligently managed gateway system 104 to the network 106. The connectivity-aware customized intelligently managed gateway system 104 is coupled to the system monitoring server 108 and the system control server 110 through the network 106. The network 106 can be implemented in whole or in part through a computer-readable medium. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. Accordingly, in some instances, the computer-readable medium can permit two or more computer-based components to communicate with each other. For example, as shown in FIG. 1, the connectivity-aware customized intelligently managed gateway system 104 can communicate with the system monitoring server 108 and the system control server 110 through the network 106.

The network 106 can be practically any type of communications network, such as the Internet or an infrastructure network. The network 106 can be implemented as part of a cellular network or a radio network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). For example, the network 106 can include one or more wide area networks (WANs), metropolitan area networks (MANs), campus area networks (CANs), or local area networks (LANs); theoretically, the computer-readable medium could be a network of any size or characterized in some other fashion. Networks can include enterprise private networks and virtual private networks (collectively, "private networks"). As the name suggests, private networks are under the control of a single entity. Private networks can include a head office and optional regional offices (collectively, "offices"). Many offices enable remote users to connect to the private network offices via some other network, such as the Internet. The example of FIG. 1 is intended to illustrate a network 106 that may or may not include more than one private network.

A computer system, as used in this paper, includes at least a processor and usually memory and a device (e.g., a bus) coupling the memory to the processor. The processor can include, for example, a general-purpose central processing unit (CPU), such as a microprocessor, or a special-purpose processor, such as a microcontroller. In general, a computer system will include a processor, memory, non-volatile storage, and an interface.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory (e.g., registers, random access memory (RAM), non-volatile (NV) storage, to name a few).

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for varying amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that can include a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Additionally, the various systems or servers described in this paper can be compatible with or implemented through a cloud-based computing system. As used in this paper, a cloud-based computing system is a system that provides virtualized computing resources, software and/or information to client devices. "Cloud" may be a marketing term and for the purposes of this paper can include any of the networks described herein.

The connectivity-aware customized intelligently managed gateway system 104 can operate to monitor a device within the monitored system 102. The monitored devices and/or managed devices included as part of the monitored system 102, can be devices that perform a function. Additionally, as will be discussed in greater detail later, the connectivity-aware customized intelligently managed gateway system 104 can operate to manage any number of devices within the monitored system 102. In monitoring a device within the monitored system 102, the connectivity-aware customized intelligently managed gateway system 104 can retrieve and/or generate monitored device data.

Monitored device data can include status data about the monitored device. The status data can include data about the functioning of the monitored device. Specifically, the connectivity-aware customized intelligently managed gateway system 104 can receive or generate data related to checking the functioning of the device. Checking the functioning of the device can include determining whether the device is actually performing the function. Furthermore, checking the functioning of the device can include whether the device is performing the function in accordance with a standard of the function. For example, the monitored device can be a vending machine with the function of dispensing an item. Checking the functioning of dispensing of an item can include whether the vending machine is dispensing the specific items that are requested by a customer or whether the vending machine is dispensing the items within a specific amount of time, as can be dictated by the standard for the vending machine.

The status data can also include information related to the lifetime of operation of the monitored device. In particular, the information related to the lifetime of operation of the monitored device can include the number of times that the monitored device has performed a function. The information related to the lifetime of operation of the monitored device can be used to determine whether or not the monitored device has exceed its operational time and needs to be replaced or repaired.

Additionally, the status data can include data related to the components that make up the monitored device. The data related to the components can include whether or not the components are operating. As a result, the data related to the components of the monitored device can be used to diagnose a problem with the monitored device and the necessary steps that are needed to repair the device. Therefore, a repair person can bring with them the necessary components to fix the monitored device on site in the first trip without having to first diagnose the problem with the device. For example, if a motor in a vending machine is broken, a repair person can diagnose that the motor is broken off site before even visiting the site of the device, and bring a replacement motor onsite and fix the vending machine without having to make multiple onsite trips.

In being coupled to the monitored system 102, the connectivity-aware customized intelligently managed gateway system 104 is connectivity-aware. In being connectivity-aware, the connectivity-aware customized intelligently managed gateway system 104 can be configured to determine whether a specific monitored system 102 or a device within the monitored system 102 is actually connected to the connectivity-aware customized intelligently managed gateway system 104. Connected to a connectivity-aware customized intelligently managed gateway system 104, can include the sending of data from the monitored system 102 to the connectivity-aware customized intelligently managed gateway system 104. Connected to the connectivity-aware customized intelligently managed gateway system 104 can also include the receipt of data from the monitored system 102.

The system monitoring server 108 can function to receive, through the network 106, the monitored device data form the connectivity-aware customized intelligently managed gateway system 104. The system monitoring server 108 is coupled to a monitored system datastore 112, which is also coupled to the system control server 110. The system monitoring server 108 can store the monitored device data on the monitored system datastore 112.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The datastores described in this paper can include cloud-based datastores that are compatible with a cloud-based computing system and cloud-based engines. Therefore, parts or the entirety of the system datastore 112 can be integrated in the cloud and be compatible with cloud-based computing systems.

The connectivity-aware customized intelligently managed gateway system 104 can be both managed by itself and the system control server 110. In being managed by itself, the connectivity-aware customized intelligently managed gateway system 104 is in part intelligently managed. In part of managing itself, the connectivity-aware customized intelligently managed gateway system 104 can send gateway system data to the system control server 110 without being prompted by the system control server 110 to send the gateway system data. The system control server 110 can receive the gateway system data sent, without being prompted, by the connectivity-aware customized intelligently managed gateway system 104 and store the gateway system data in the monitored system datastore 112.

The gateway system data can include status data of the of the connectivity-aware customized intelligently managed gateway system 104. The status data can include information related to the functioning of the connectivity-aware customized intelligently managed gateway system 104 or specific components of the connectivity-aware customized intelligently managed gateway system 104. For example, the status data can include whether data is being sent from a port of the connectivity-aware customized intelligently managed gateway system 104 is sending data to or receiving data from a device of the monitored system 102 that is coupled to the port. In another example, the status data can include the strength of the signal received by the connectivity-aware customized intelligently managed gateway system 104 from the network 106, in the implementation in which the network 106 is a radio network.

Furthermore, the connectivity-aware customized intelligently managed gateway system 104 can manage itself by performing procedures on itself or parts of itself. The procedures can include any task that can be performed on the hardware and software that form the connectivity-aware customized intelligently managed gateway system 104. For example, the procedure can be a reboot or restart of the connectivity-aware customized intelligently managed gateway system 104. The procedures performed by the connectivity-aware customized intelligently managed gateway system 104 on itself can be triggered by events that occur either within the network 106, the monitored system 102, or the connectivity-aware customized intelligently managed gateway system 104. For example, if the network 106 is a radio network, and the signal received from the network 106 by the connectivity-aware customized intelligently managed gateway system 104 falls below previously specified signal strength, the connectivity-aware customized intelligently managed gateway system 104 can perform a reboot or a restart. In an alternative example, if the connectivity-aware customized intelligently managed gateway system 104 loses a connection with the network 106 a specific number of times within a specific time period, such as three lost connections within a day, the connectivity-aware customized intelligently managed gateway system 104 can perform a reboot or a restart.

In a specific implementation, in being managed by itself, the connectivity-aware customized intelligently managed gateway system 104 can determine, by itself, when to monitor a device of a monitored system. In one example, the connectivity-aware customized intelligently managed gateway system 104 can be programmed to collect and/or generate monitored device data after a specific amount of time has passed, such as a day. Specifically, the connectivity-aware customized intelligently managed gateway system 104 can either include an internal clock or receive clock data form the system control server 110 to determine when to collect monitored device data. In another example, the connectivity-aware customized intelligently managed gateway system 104 can be programmed to collect and or generate monitored device data after a specific event has occurred, either within the monitored system 102 or any other system that is part of the system of FIG. 1. For example, the connectivity-aware customized intelligently managed gateway system 104 can be programmed to collect monitored device data after the managed device performs a function or after a user uses the monitored device. Additionally, the connectivity-aware customized intelligently managed gateway system 104 can be programmed to collect specific monitored device data, such as status data for a specific component of the monitored device.

Alternatively, the connectivity-aware customized intelligently managed gateway system 104 can be managed by the system control server 110. In managing the connectivity-aware customized intelligently managed gateway system 104, the system control server 110 can receive or collect gateway system data from the connectivity-aware customized intelligently managed gateway system 104. The gateway system data, as discussed previously, can include status data of the connectivity-aware customized intelligently managed gateway system 104.

Additionally, in managing the connectivity-aware customized intelligently managed gateway system 104, the system control server 110 can direct the connectivity-aware customized intelligently managed gateway system 104 to collect and/or generate monitored device data. In directing the connectivity-aware customized intelligently managed gateway system 104 to collect and/or generate monitored device data, the system control server 110 can send instructions to the connectivity-aware customized intelligently managed gateway system 104 to collect and/or generate monitored device data. The instructions sent by the system control server 110 can include what monitored system data for the connectivity-aware customized intelligently managed gateway system 104 to generate and/or collect with respect to the monitored device. For example, the system control server 110 can send instructions to the connectivity-aware customized intelligently managed gateway system 104 to collect and/or generate status data for a specific component of the monitored system.

The system control server 110 can generate the instructions that are sent to the connectivity-aware customized intelligently managed gateway system 104 regarding the collection and/or generation of monitored device data from the monitored device data that is stored in the monitored system datastore 112. The system control server 110 can store the generated instructions for future use on the monitored system datastore 112 or another datastore. Alternatively, the system control server 110 can generate the instructions that are sent to the connectivity-aware customized intelligently managed gateway system 104 regarding the collection and/or generation of monitored device data from the input of a user. The user input can be stored on the monitored system datastore 112 or another datastore. The user can be the customer who purchased the connectivity-aware customized intelligently managed gateway system 104, a person associated with the customer, or a person who is authorized by the customer to be given access to and manage the devices in the monitored system.

In being able to modify or control the instructions that are sent to the connectivity-aware customized intelligently managed gateway system 104, the connectivity-aware customized intelligently managed gateway system 104 is in part a customizable intelligently managed system. Specifically, a user can program, through the system control server 110, when the connectivity-aware customized intelligently managed gateway system collects and/or generates monitored system data for a monitored device. For example, a user can program the connectivity-aware customized intelligently managed gateway system 104 to collect and/or generate data after the occurrence of a specific event, either within the monitored system 102 or the system for monitoring the system, or after a period of time has passed.

Figure 2:
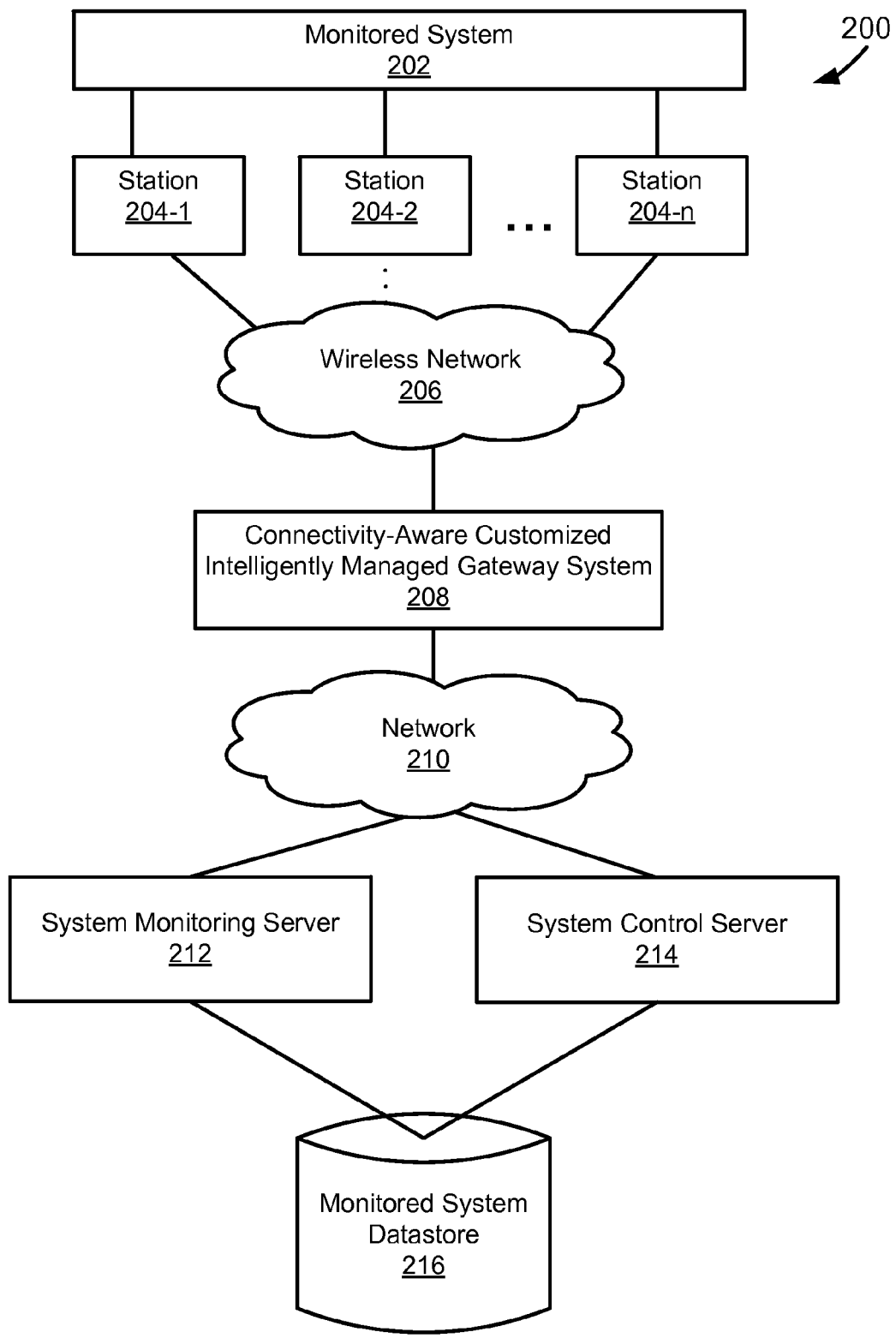
FIG. 2 depicts a diagram of an example of a system for monitoring a system.

FIG. 2 depicts a diagram 200 of another example of a system for monitoring a system. The system depicted in FIG. 2 includes a monitored system 202, a connectivity-aware customized intelligently managed gateway system 208, a network 210, a system monitoring server 210, a system control server 214 and a monitored system datastore 216.

The monitored system can include any number of monitored devices or managed devices. The monitored and/or managed devices can be any of the devices and perform any of the functions discussed with the devices of the monitored system described in the other FIGS. of this paper. The connectivity-aware customized intelligently managed gateway system 208 can include gateways that perform any of the functions of the connectivity-aware customized intelligently managed gateway systems or other gateways described in the other FIGS. of this paper. The network 210 can be integrated in the same way as and to perform the same functions as any of the other networks described in this paper. The system monitoring server 210 and system control server 214 can be integrated as or perform the same functions as any of the system monitoring servers or system control servers described in this paper. The monitored system datastore 216 can store the same data as any of the monitored system datastores described in this paper.

In the example of FIG. 2, the connectivity-aware customized intelligently managed gateway system 208 is coupled to stations 204-1 . . . 204-$n$ (hereinafter collectively referred to as "stations 204") through a wireless network 206. A station, as used in this paper, may be referred to as a device with a media access control (MAC) address and a physical layer (PHY) interface to a wireless medium that complies with the IEEE 802.11 standard. Thus, for example, edge devices 112-1 . . . 112-$n$ and network APs 110-1 . . . 110-$n$ with which the edge devices 112-1 . . . 112-$n$ associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference.

The wireless network 206, can be integrated as part of a system that is IEEE 802.11 standard compatible or compliant. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In an alternative implementation, the stations 204 may comply with a different standard other than Wi-Fi or IEEE 802.11 and may be referred to as something other than a "station," and may have different interfaces to a wireless or other medium. For example, the stations 204 can be coupled through a wireless network 206 that is a ZigBee® network that complies with the ZigBee® protocol. Specifically, the wireless network 206 can be implemented to be compliant with the IEEE 802.15.4 standard, which is hereby incorporated by reference. Additionally, the stations 204 can be configured to be compliant with the IEEE 802.15.4 standard.

The stations 204 are coupled to devices within the monitored system 202. Each of the stations 204 can be coupled to more than one device within the monitored system 202. The connectivity-aware intelligently managed gateway system 208 is coupled to the devices within the monitored system 202 through the wireless network 206 and the stations 204.

Station 204-2 is shown coupled to the wireless network 206 through a dashed line to illustrate that the stations 204, in one implementation, are not always connected to the wireless network 206 and the connectivity-aware customized intelligently managed gateway system 208. Whether the stations 204 are connected to the wireless network 206 can depend on the strength of the signal of the wireless network 206 received by the stations 204. Specifically, the station 204-2 can be connected to the wireless network 206, and in turn the connectivity-aware customized intelligently managed gateway system 208, when the signal strength of the wireless network 206 is strong enough to support the sending of data between the station 204-2 and the connectivity-aware customized intelligently managed gateway system 208. Alternatively, if the signal strength of the wireless network 206 is not strong enough to support the sending of data between the station 204-2 and the connectivity-aware customized intelligently managed gateway system 208, then the station 204-2 can be unconnected from the wireless network 206.

The wireless network 206 can be implemented as an ad hoc network. Specifically, if a station cannot connect to a gateway due to low signal strength within the wireless network 206 between the gateway and the station, the station can connect to another gateway within the connectivity-aware customized intelligently managed gateway system 206. The different gateway can create a wireless network signal with enough strength to allow data to be sent between the gateway and the station. As a result, a new link is formed over which data can be transmitted within the wireless network 206. New links, within the wireless network 206, can be created based on signal strength, between any number of stations 204 and gateways within the connectivity-aware customized intelligently managed gateway system 208. The new links, within the wireless network 206 can be created between a gateway and a station whenever the signal strength between the gateway and the station over the wireless network 206 is strong enough to allow for the transmission of data. As new links can be created over which data is transmitted between the stations 204 and the gateways, the stations 204, the devices within the monitored system 202, and the gateways within the connectivity-aware customized intelligently managed gateway system 208 can be physically moved with less risk of the station being unconnected from the wireless network 206.

The wireless network 206 can also be implemented as a mesh network. Specifically, multiple gateways of the connectivity-aware customized intelligently managed gateway system 208 can be connected, over the wireless network 206, to a station. Therefore, many links can be formed between a station and various gateways within the connectivity-aware customized intelligently managed gateway system 208. In the event that one of the links fails, so that data can no longer be transmitted over the leak, for example, because of a decrease in wireless signal strength over the failed link, data can be transmitted over another link. The system control server 214 can manage the connectivity-aware customized intelligently managed gateway system to control over which link data is transmitted to and from a station.

The connectivity-aware customized intelligently managed gateway system 208 can be configured to detect which stations are connected to the wireless network 206 at any given time. The connectivity-aware customized intelligently managed gateway system 208 can use information about which stations are connected to the wireless network 206 to determine when to collect and/or generate monitored system data. Specifically, if a particular station that is coupled to a specific monitored device becomes connected to the wireless network 206 after being disconnected from the wireless network, the connectivity-aware customized intelligently managed gateway system 208 can retrieve monitored device data from the specific monitored device.

Additionally, the connectivity-aware customized intelligently managed gateway system 208 can send the information about which stations are connected to the wireless network 206 to the system control server 214. The system control server 214 can use the information about which stations are connected to the wireless network 206 to generate instructions for the connectivity-aware customized intelligently managed gateway system 208 to collect and/or generate monitored device data for the monitored device coupled to the station. For example, if a specific monitored device is coupled to a station that becomes connected to the wireless network, the system control server 214 can instruct the connectivity-aware customized intelligently managed gateway system 208 to collect and/or generate monitored device data for the specific monitored device.

The wireless network 206, can be made up of a plurality of radios (not shown). The radios can be low powered digital devices that are configured to comply with the ZigBee® protocol to form a ZigBee® network. Specifically, the radios can acts nodes in compliance with the ZigBee® standard within the wireless network 206. The radios can operate in the 2.4 GHz, the 915 MHz and the 868 MHz radio frequency bands. The radios can function as a ZigBee® coordinator (hereinafter referred to as "ZC"). In functioning as a ZC, the radios can be used to form a bridge between the wireless network 206 and the connectivity-aware customized intelligently managed gateway system 208 and the stations 204. The radios can also function as a ZigBee® router (hereinafter referred to as "ZR"). In functioning as a ZR, the radios can receive data and send the data to other devices or systems, or other radios within the wireless network 206. The radios can also function as ZigBee® end device (hereinafter referred to as "ZED"). In functioning as a ZED, the radios can receive data from the radios functioning as either ZRs or ZCs and send the data to a destination device or system, such as the stations 204.

Figure 3:
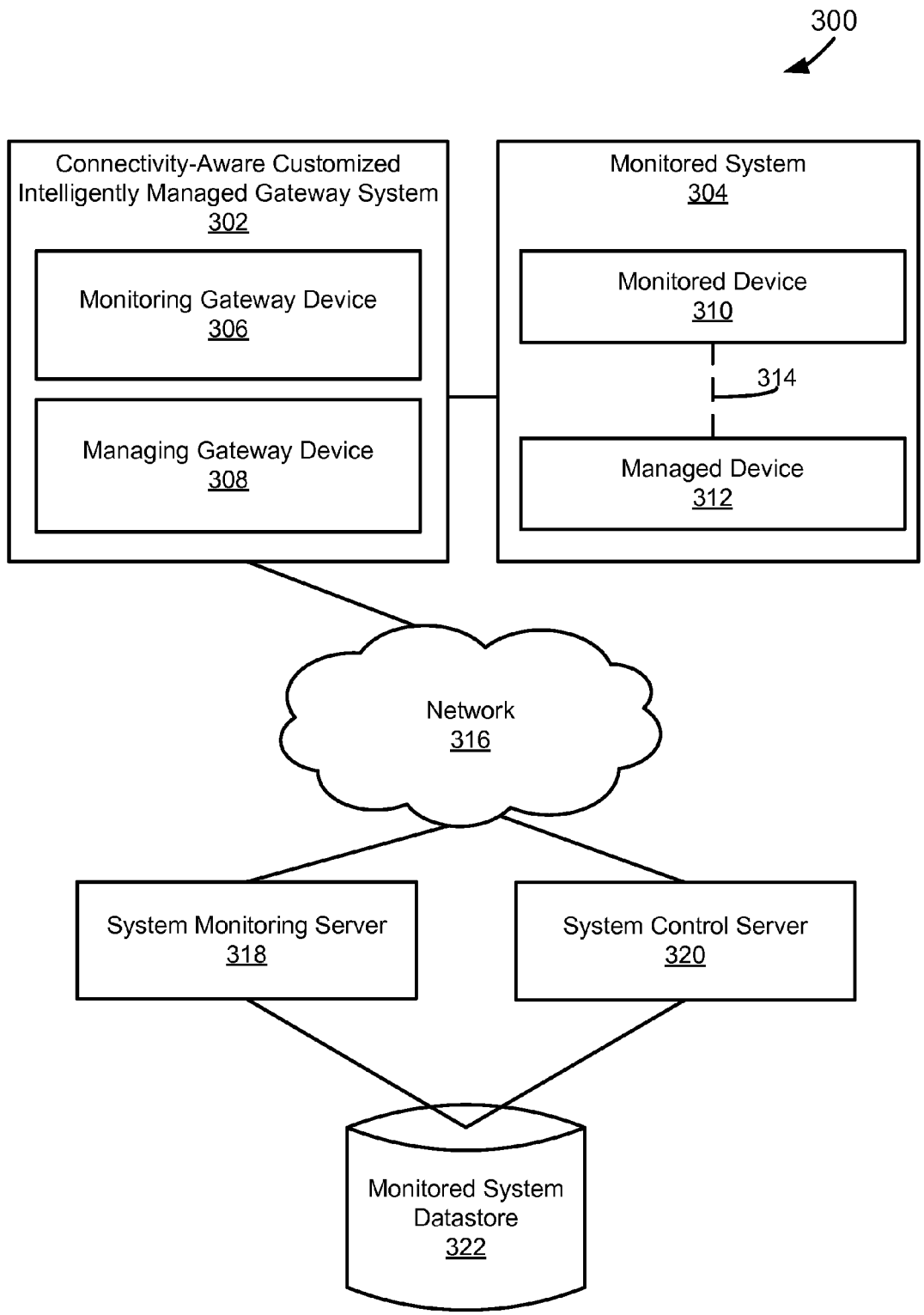
FIG. 3 depicts a diagram of an example of a system for monitoring and managing devices within a monitored system.

FIG. 3 depicts a diagram 300 of an example of a system for monitoring and managing devices within a monitored system. The system shown in FIG. 3 includes a connectivity-aware customized intelligently managed gateway system 302, a monitored system 304, a network 316, a system monitoring server 318, a system control server 320 and a monitored system datastore. The connectivity-aware customized intelligently managed gateway system 302 is coupled to the monitored system 304 and the network 316. The connectivity-aware customized intelligently managed gateway system 302 is coupled to the system monitoring server 318 and the system control server 320 through the network 316. The system monitoring server 318 and the system control server 320 are coupled to the monitored system datastore 322.

The connectivity-aware customized intelligently managed gateway system 302 can include gateways that perform any of the functions of the connectivity-aware customized intelligently managed gateway systems or gateways described in the other FIGS. of this paper. The network 316 can be integrated in the same way as and to perform the same functions as any of the other networks described in this paper. The system monitoring server 318 and system control server 320 can be integrated as or perform the same functions as any of the system monitoring servers or system control servers described in this paper. The monitored system datastore 322 can store the same data as any of the monitored system datastores described in this paper.

The monitored system 304 includes a monitored device 310 and a managed device 312. The monitored device 310 and managed device 312 can be any of the devices and perform any of the functions discussed with the devices of the monitored system described in the other FIGS. of this paper. The connectivity-aware customized intelligently managed gateway system 302 includes a monitoring gateway device 306 and a managing gateway device 308. The monitoring gateway device 306 can be coupled to the monitored device 310, while the managing gateway device 308 can be coupled to the managed device 312. The monitoring gateway device 306 can monitor the monitored device 310, while the managing gateway device 308 can manage the managed device 312. While the functions of monitoring and managing separate devices within the monitored system are performed by two separate gateway devices within the connectivity-aware customized intelligently managed gateway system 302, a single gateway device within the gateway system can perform the functions of both monitoring a device and managing either the same or another device within the monitored system 304.

In managing the managed device 312, the managing gateway device 308 can control how the managed device 312 functions. For example, if the managed device is a vending machine and functions to dispense an item whenever it receives one dollar, the managing gateway device 308 can change the functioning of the vending machine to dispense an item whenever it receives one dollar and twenty-five cents. In managing the managed device 312, the managing gateway device 308 can control how the managed device 312 performs a function. For example, if the managed device 312 is a vending machine that has a primary motor and a backup motor, the managing gateway device 308 can instruct the vending machine to use the backup motor instead of the primary motor.

The managing gateway device 308 can manage the managed device 312 based on instructions that are programmed into the managing gateway device 308. Additionally, the managing gateway device 308 can manage the managed device 312 based on instructions for managing the managed device 312 generated by and received from the system control server 320. Furthermore, the managing gateway device 308 can manage the managed device 312 based on instructions that are generated by a user. The user can program the instructions into the managing gateway device 308, or into a datastore from which the system control server 320 can retrieve the instructions and send the instructions to the managing gateway device 308.

While the gateways within the connectivity-aware customized intelligently managed gateway system 302 can manage the managed device 312, they can also monitor the managed device 312. Specifically, the managed device 312 can be both managed and monitored simultaneously. The managed device 312 can be managed, at least in part, based on the monitored device data of the managed device 312. The monitored device data of the managed device 312 can include any of the previously described data that is part of monitored device data, such as status data. Additionally, the managed device 312, in any of the discussed methods and techniques, can be managed, at least in part, based on data or instructions input by a user.

In managing the managed device 312 based on the monitored device data of the managed device 312, the managing gateway device 308 can receive the monitored device data of the managed device 312 and send instructions to the managed device 312. The instructions can include change the functionality of the managed device 312 or change the way in which a function is performed by the managed device 312. Alternatively, in the management of the managed device 312 based on the monitored device data of the managed device 312, any gateway can retrieve and/or generate monitored device data of the managed device 312, and send such data to the system monitoring server 318. The system monitoring server 318 can store the data on the monitored system datastore 322, where it can be retrieved by the system control server 320. The system control server can use the monitored device data of the managed device 312 stored on the monitored system datastore 322 to generate or retrieve instructions for managing the managed device 312. The system control server 320 can send the instructions for managing the managed device 312 to the managing gateway device 308, which can use the instructions to manage the managed device 312 according to the instructions received from the system control server 320.

The managed device 312 can be managed based on another device within the monitored system 304, such as monitored device 310. Specifically, the monitored device 310 and the managed device 312 can be related, as is illustrated by dashed line 314 connecting the monitored device 310 to the managed device 312. The devices can be related by the functions they perform. For example, the device can perform complimentary functions. The managing gateway device 308 can manage the managed device 312 based on monitored device data of the monitored device 310. In particular, either the managing gateway device 308 or the system control server can generate or retrieve instructions for managing the managed device 312.

In one example of managing the managed device 312 based on the monitored device data of the monitored device 310, the monitored device 310 can be a pool water level sensor, and the managed device 312 can be a valve that controls the flow of water into the pool. In operation, the monitored device data of the pool water level sensor can indicate that the water level within the pool has dropped below a certain level. The managing gateway device 308 can then use the monitored device data of the pool water level sensor indicating that the water level in the pool has dropped below a certain level to cause the managed device to change function. Specifically, if the managed device 312 is a valve, the managing gateway device 308 can cause the valve to turn on, thereby changing the function of the valve, so that water flows into the pool. The managing gateway device 308 can continue to manage the pool valve and cause water to flow into the pool until the water level in the pool is above a level determined by the pool water level sensor.

Figure 4:
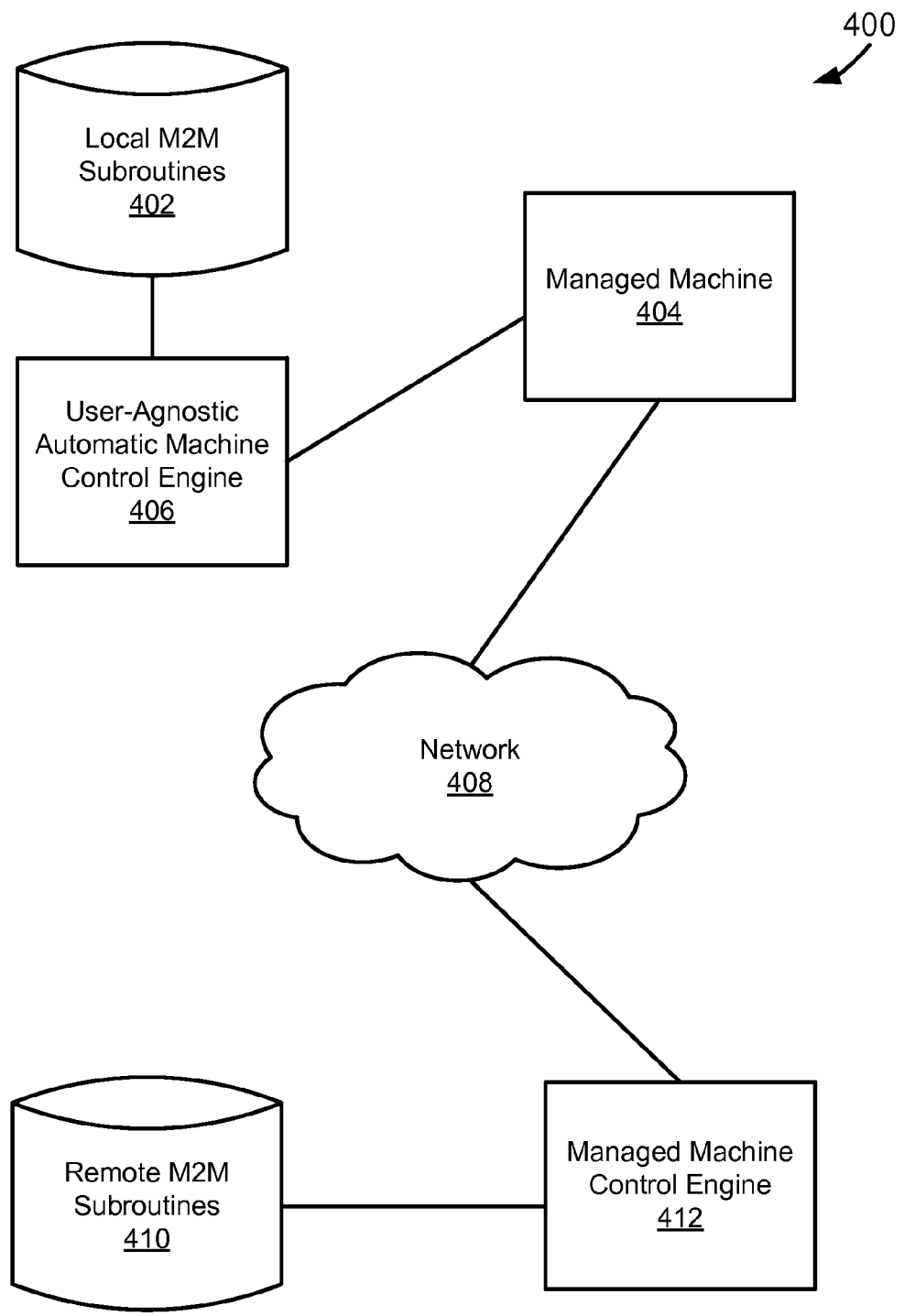
FIG. 4 depicts a diagram of an example of a system for managing a device.

FIG. 4 depicts a diagram 400 of an example of a system for managing a device. The example system of FIG. 4 includes a managed machine 404 coupled to a network 408 and a managed machine control engine 412. The network 408 can be implemented as or function as any of the networks described in this paper. The managed machine control engine 412 can be implemented as part of the system control servers discussed in this paper. The managed machine 404 can be a managed device that performs any of the functions of the example managed devices and/or monitored devices described in this paper.

The managed machine is coupled to a local machine to machine (hereinafter referred to as "M2M") subroutines datastore 402 and a user-agnostic automatic machine control engine 406. The local M2M subroutines datastore 402 and the user-agnostic automatic machine control engine 406 can be implemented as part of a gateway device within any of the connectivity-aware customized intelligently managed gateway systems discussed in this paper. The subroutines stored in the local M2M subroutines datastore 402 can be the subroutines executed by the managed machine 404 in performing a function. For example, if the managed machine 404 is a vending machine, a subroutine can be the accepting of coins from a user of the vending machine. Another example of a subroutine for a vending machine can be the retrieval of the product selected by the user. The subroutines are M2M subroutines in that a device/machine connected to the managed machine 404, such as a gateway device or the user-agnostic automatic machine control engine 406, implemented as part of the gateway device, determines what subroutines the managed machine 404 should execute and instructs the managed machine 404 to execute the subroutines.

The subroutines can be generated by a user and stored on the local M2M subroutines datastore 402. Additionally, the subroutines can be generated by the user-agnostic automatic machine control engine 406 or the managed machine control engine 412 and stored on the local M2M subroutines datastore 402. Further, the subroutines can be retrieved from the remote M2M subroutines datastore 410 and stored on the local M2M subroutines datastore 402.

The local M2M subroutines datastore 402 can be locally removable. Specifically, the local M2M subroutines datastore 402 can be removable from a gateway in the gateway system. In being removable, the local M2M subroutines datastore 402 can be implemented as an add-on card or any other mobile or removable storage medium. The local M2M subroutines datastore 402 can be uniquely associated with a specific type of managed machine. Specifically, the local M2M subroutines datastore 402 can include any number or all of the subroutines that a specific managed machine 404 can execute in performing the various functions of the managed machine 404. For example, the local M2M subroutines datastore 402 can include all of the subroutines for a vending machine. In being uniquely associated with a managed machine 404 and being removable and mobile, a user can couple a specific local M2M subroutines datastore to the user-agnostic automatic machine control engine 406 based on the managed machine that is coupled to the user-agnostic automatic machine control engine 406.

The user-agnostic automatic machine control engine 406 can function to monitor the managed machine 404 and control, at least in part, which subroutines are executed by the managed machine 404. Specifically, the user-agnostic automatic machine control engine 406 can determine which subroutines the managed machine 404 needs to execute and/or generate instructions for the managed machine 404 to execute the determined subroutines. The user-agnostic automatic machine control engine 406 is user-agnostic in that it can determine which subroutines need to be executed by the managed machine 404 without being directed by or receiving input from a user.

Additionally, the user-agnostic automatic machine control engine 406 can monitor the managed device and receive or generated monitored device data for the managed device. The user-agnostic automatic machine control engine 406 can determine what subroutines the managed machine 404 needs to execute based on the monitoring of the managed machine 404 or the received managed device data of the managed machine 404. For example, the user-agnostic automatic machine control engine 406 can determine which subroutines need to be executed by the managed machine based on events or the passing of thresholds in the functioning of the managed machine 404. Specifically, if the managed machine is a vending machine and a user selects a particular item, the user-agnostic automatic machine control engine 406 can determine that the vending machine needs to perform the subroutine of retrieving the particular item and instruct the vending machine to execute the subroutine and retrieve the particular item.

The user-agnostic automatic machine control engine 406 can use the data contained in the local M2M subroutines datastore 402 to determine which subroutine the managed machine 404 needs to execute. Specifically, the data contained in the local M2M subroutines datastore 402 can include an event or the passing of a threshold and the subroutines that need to be performed if the user-agnostic automatic machine control engine 406 detects the occurrence of the event or the passing of a threshold in the functioning of the managed machine 404. The user-agnostic automatic machine control engine 406 can detect the occurrence of the event or the passing of the threshold in the managed machine 404 and then retrieve the subroutines that need to be performed in response to the detected occurrence of the event or the passing of the threshold.

Additionally, the user-agnostic automatic machine control engine 406 can determine which subroutine the managed machine 404 needs to execute based on the time or the passage of an amount of time. For example, the user-agnostic automatic machine control engine 406 can determine that a vending machine needs to perform an inventory check every day. The automatic machine control engine 406 can determine that a day has passed, from a clock, and instruct the vending machine to perform an inventory check. The clock can be implemented internally as part of the user-agnostic machine control engine 406.

The managed machine 404 is coupled, through the network 408 to a managed machine control engine 412, which can be implemented as a cloud-based engine. The managed machine control engine 412 is coupled to a remote M2M subroutines datastore 410. The remote M2M subroutines datastore can contain subroutines that can be executed by the managed machine 404. As with the subroutines contained in the local M2M subroutines datastore 402, the subroutines contained within the remote M2M subroutines datastore 410 can be executed by the managed machine 404 to perform a function. The subroutines are M2M subroutines in that a device/machine connected to the managed machine 404, such as managed machine control engine 412 determines what subroutines the managed machine 404 should perform and instructs the managed machine 404 to execute the subroutines.

The subroutines can be generated by a user and stored on the remote M2M subroutines datastore 410. Additionally, the subroutines can be generated by the user-agnostic managed machine control engine 412 or the user-agnostic automatic control engine 406 and stored on the remote M2M subroutines datastore 410. Further, the subroutines can be retrieved from the local M2M subroutines datastore 402 and stored on the remote M2M subroutines datastore 410.

The managed machine control engine 412 can function to monitor the managed machine 404 and control, at least in part, which subroutines are executed by the managed machine 404. Specifically, the managed control engine 412 can determine which subroutines the managed machine 404 needs to execute and generate instructions for the managed machine 404 to execute the determined M2M subroutines. The M2M subroutines can be stored on the remote M2M subroutines datastore 410, from which the managed machine control engine can determine and generate the instructions for the managed machine 404 to execute the M2M subroutines. The managed machine control engine 412 can send instructions to the managed machine 404 to execute the determined subroutines. The managed control engine 412, like the user-agnostic automatic machine control engine 406, can also be user-agnostic in that it can determine what subroutines the managed machine 404 needs to execute based on monitoring of the managed machine or received managed device data of the managed machine 404. The managed control engine 412 can retrieve the determined subroutine from the remote M2M subroutines datastore 410 and instruct the managed machine 404, through the network 408, to execute the determined subroutine.

The subroutines contained in the remote M2M subroutines datastore 410 can require that an owner of the managed machine purchase the right to use the subroutines before the managed machine control engine 412 can retrieve the subroutine and send the subroutines to the managed machine 404 for execution. The subroutines can be bundled into a group of subroutines based on the type of device or machine that the subroutines are executed on and a user of the type of device or machine can purchase the right, all at once, to use all of the subroutines bundled into the group.

Figure 5:
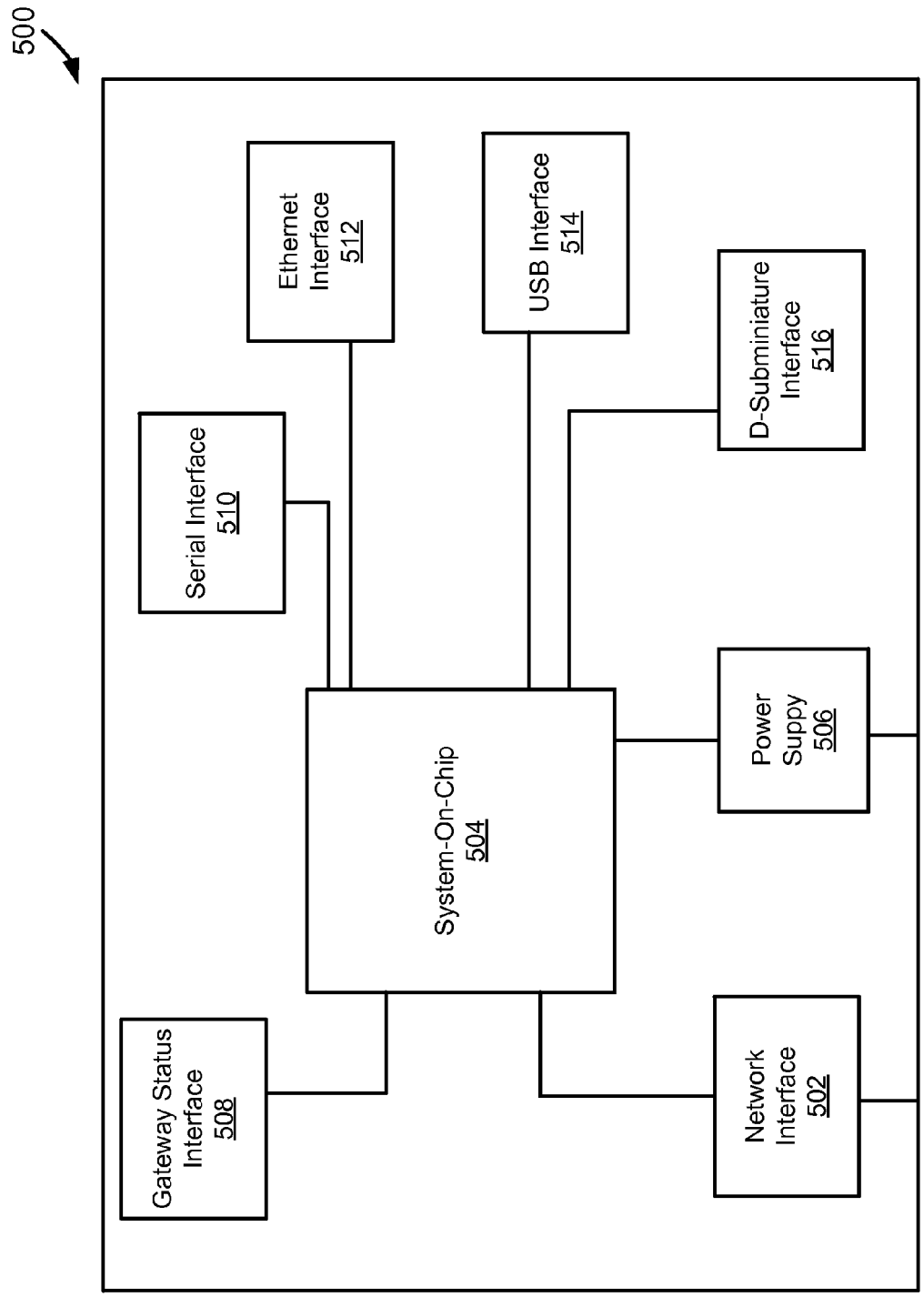
FIG. 5 depicts a diagram of an example of a gateway device that is part of a connectivity-aware customized intelligently managed gateway system.

FIG. 5 depicts a diagram 500 of an example of a gateway device that is part of a connectivity-aware customized intelligently managed gateway system. The gateway device includes a network interface 502 and a power supply 506. Additionally, the gateway device can include any combination of a gateway status interface 508, a serial interface 510, an Ethernet interface 512, a universal serial bus (hereinafter referred to as "USB") interface 514 and a D-subminiature interface 516. The serial interface 510, the Ethernet interface 512, the USB interface 510 and the D-subminiature interface 516 can be collectively referred to as the connected device interfaces of the gateway device. The connected device interfaces of the gateway device can also include a wireless interface, through which the gateway device can be wirelessly connected to any number of managed and/or monitored devices in a monitored system. Specifically, the wireless interface can be integrated as an access point for the various managed and/or monitored device. The network interface 502, the power supply 506 and the connected device interfaces of the gateway device can be coupled to a system-on-chip 504.

The network interface 502 can be an interface to a cellular or radio network. The radio network can be a WiFi network or a satellite based network. In one example, the network interface can be an interface to a ZigBee® network. The network interface 502 can be coupled to and configured to function with any number of antennas in an antenna array that operate in accordance with any mobile telecommunications protocol, including the 2G, 3G, and 4G cellular communication protocols. For example, the network interface can be configured to be coupled to a single antenna and operate within the 2.5G cellular communication protocol. Additionally, the network interface 502 can be configured to be coupled to two antennas and operate within any of the long-term evolution (LTE) protocols. Furthermore, the network interface 502 can be configured to be coupled to three antennas, one of which is a global positioning system (hereinafter referred to as "GPS") antenna. In being coupled to a GPS antenna, the location data of the gateway device can be determined.

The antennas to which the network interface 502 can be coupled, can be included as part of the gateway device when a user initially purchases the gateway device. Alternatively, the antennas cannot be included with the gateway device when a user initially purchases the gateway device, allowing a user to use their own antennas. Furthermore, multiple antennas of different types can be included with the gateway device when a user initially purchases the gateway device, allowing a user to customizable create an antenna array or select the antenna to which the network interface 502 is coupled.

The gateway device also includes a power supply 506. The power supply 506 can be removable from the gateway device and replaced with another power supply. Additionally, the power supply, in being removable from the gateway device, can be included or not included with the gateway device when a user purchases the gateway device. The systems and various interfaces within the gateway device can be configured to draw small amounts of power from the power supply 506 during the overall operation lifetime of the device. For example, the system and various interfaces can be configured to only draw normal operational power when the antennas receive or transmit data.

Managed and/or monitored devices can be connected to the gateway device through the serial interface 510, the Ethernet interface 512, the USB interface 514, and the D-subminiature interface 516. As the gateway device can have multiple types of interfaces, e.g. the serial interface 510 and the USB interface 514, multiple managed and/or monitored devices can be connected to the gateway device simultaneously. The USB interface 514 can be configured to operate according to any USB standard, including USB 1, USB 2.0 and USB 3.0. The D-subminiature interface 516 can be any of the D-subminiature communication ports recognized as being within the D-subminiature type, including a DB26 communication port. Monitored device data or data that is used to generate monitored device data can be received through the serial interface 510, the Ethernet interface 512, the USB interface 514 and the D-subminiature interface 516 from the various managed and/or monitored devices that are connected to each corresponding interface. Similarly, instructions related to the managing of a managed device, including instructions for performing subroutines, can be transmitted through the serial interface 510, the Ethernet interface 512, the USB interface 514, and the D-subminiature interface to the various devices that are connected to each corresponding interface. Furthermore, the local M2M subroutines datastore can be coupled to the gateway device through any of the serial interface 510, the Ethernet interface 512, the USB interface 514, and the D-subminiature interface 516.

The system-on-chip 504 can include all of the components of a computer system on a single chip. The system-on-chip 504 can function to route or send data that is received through the antennas to any of the various interfaces or systems of the gateway device. Specifically, if data is received for a particular managed or monitored device that is connected to a particular interface, e.g. the Ethernet interface 512, the system-on-chip 504 can send the received data to the Ethernet interface 512. Similarly, the system-on-chip can function to route or send data that is received from the managed devices or monitored devices connected to the various interfaces, such as the Ethernet interface 512, to the network interface, where the data can be transmitted by the antenna or antenna array coupled to the network interface 502.

The system-on-chip 504 can also include local memory. The local memory can serve as a local M2M subroutines datastore. In serving as the local M2M subroutines datastore, subroutines executable on devices that are, were, or will be connected to the gateway device are stored. The subroutines can be programmed into and stored on the system-on-chip 504 by a user or a supplier or manufacturer of the gateway device. Additionally, the subroutines stored on the system-on-chip 504 can be received from local or remote M2M datastores that are coupled to the gateway device.

The gateway status interface can function as an interface through which a user is alerted as to the status of the gateway device. The status of the gateway device can include any of the information that is included as part of the previously described status data of the gateway system data. For example, the status data can include whether or not the gateway device is connected, through the network interface 502, to the network, and what the strength of the signal is received by the gateway device from the network. The user can be alerted as to the status of the gateway device visually. For example, the gateway status interface can include a series of bars that correspond to various strengths of the signal received from the network. The bars can be illuminated according to the strength of the signal received from the network, thereby visually indicating to the user whether a signal is received and what the strength of the received signal is. In another example, the gateway status interface can alert a user as to the amount of power that is left in the power supply 506.

Figure 6:
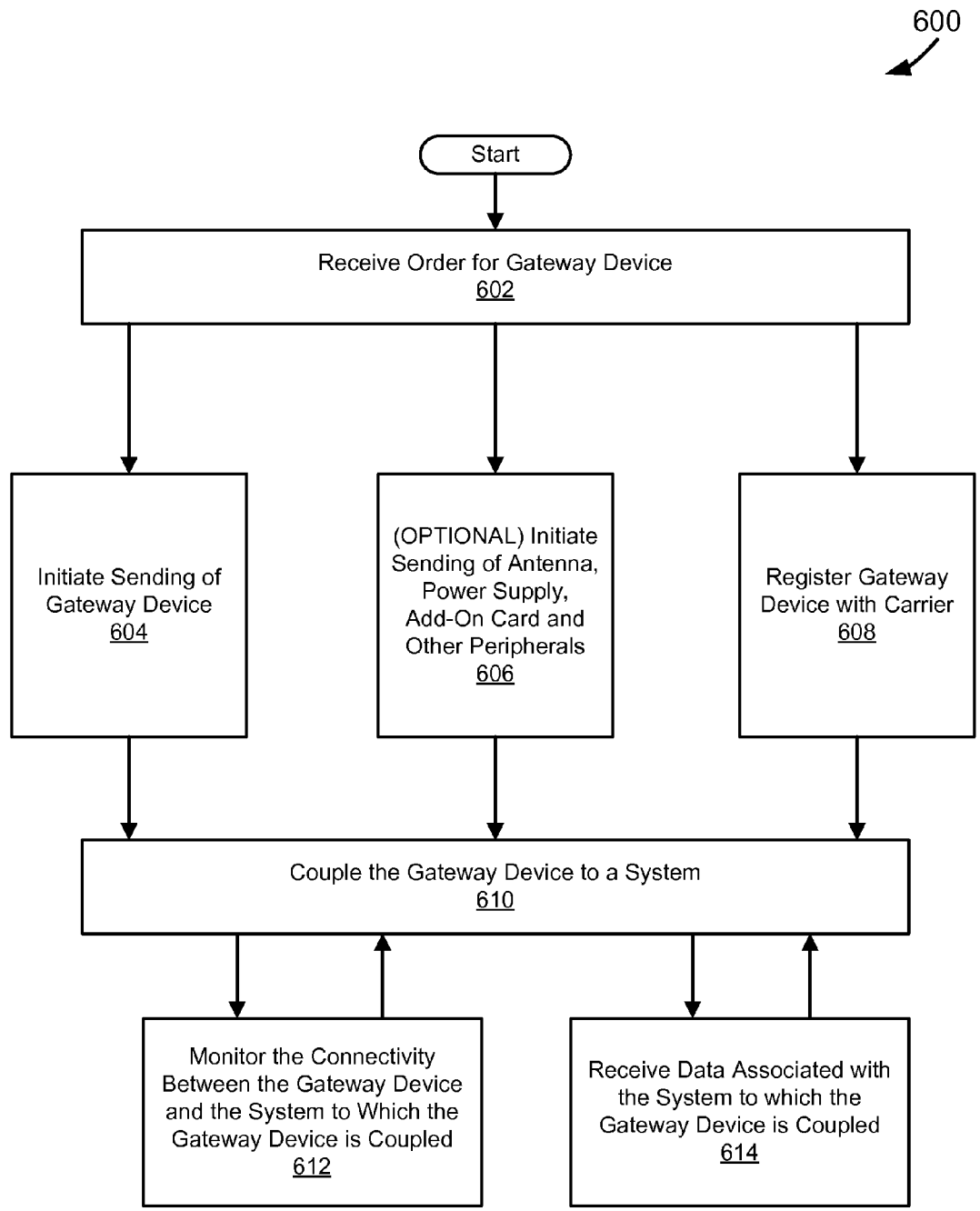
FIG. 6 depicts a flowchart of an example of a method of sending a newly purchased gateway device to a user and operating the newly purchased gateway device.

FIG. 6 depicts a flowchart 600 of an example of a method of sending a newly purchased gateway device to a user and operating the newly purchased gateway device. The flowchart 600 includes at module 602, receiving an order for a gateway device. The order can include what antennas, power supplies, add-on cards, other local M2M storage datastores and other peripherals were purchased or requested by the user. The order can be received through an on-line web interface, including an interface of a vendor or a manufacturer.

In the example of FIG. 6, the flowchart 600 continues to module 604, which includes initiating sending of the gateway device. For example, a supplier of the gateway device can initiate and send the gateway device to a user who purchased the gateway device or a designated party.

In the example of FIG. 6, the flowchart 600 continues to module 606, which includes initiating sending of antennas, power supplies, add-on cards, other local M2M datastores and other peripherals to the gateway device. The user can request which antennas, power supplies, add-on cards, other local M2M datastores and other peripherals they want to receive along with the gateway device. The requested antennas, power supplies, add-on cards, other local M2M datastore and other peripherals can be indicated in the order for the gateway device received at module 602. The user can use the requested antennas to create customized antenna arrays which can be connected to the gateway device on-site. The user can request the add-on cards and other local M2M datastores based on the types of devices that the user intends to connect to the gateway device. The requested antennas, power supplies, add-on cards, other local M2M datastores and other peripherals can be sent as part of the same package in which the gateway device is sent. The module 606 is optional because, for example, the user may have obtained peripherals from some other source or the gateway device may have certain functionality associated with peripherals built in.

In the example of FIG. 6, the flowchart 600 continues to module 608, which includes registering the gateway device with a network carrier. The network carrier can be the carrier or operator of the network to which the gateway device will be connected during operation. For example, the wireless network carrier can be the carrier of a cellular network, such as Sprint®. The network carrier can be specified by the user in the purchase order for the gateway device. The gateway device can be registered while the gateway device is sent to the user who purchased the gateway device. As a result, the gateway device can arrive at the user registered, allowing for seamless setup and operation without the user to register the gateway device.

In the example of FIG. 6, the flowchart 600 continues to module 610, which includes coupling the gateway device to a system. For example, the user who receives the gateway device can couple the gateway device to a system the user wishes to monitor. The system can be a monitored device system that includes any number of monitored and/or managed devices that can be connected to the gateway device. The monitored and/or managed devices can be connected to the gateway device through any of the ports formed by the previously discussed connected device interfaces. It may be noted that modules 604, 606, and 608 have no particular order in which they must be done prior to module 610, and in some instances some portion of module 606 or 608 could occur after module 610 (e.g., an add-on card could be sent after the gateway device was already coupled to the system or registration with a carrier could be initiated or completed after coupling the gateway device to the system).

In the example of FIG. 6, the flowchart 600 continues to module 612, which includes monitoring the connectivity between the gateway device and the system to which the gateway device is coupled. For example, in monitoring the connectivity, it can be determined whether the gateway device is coupled to the system, including the managed and/or monitored devices within the system to which the gateway device is connected. In a specific implementation, the gateway device is connectivity-aware and can monitor the connectivity and determine, by itself, whether or not it is connected to the system. The connectivity between the gateway device and the system to which the gateway device is coupled can be monitored continuously or at specific times based upon time intervals that the user can program into the gateway device.

In the example of FIG. 6, the flowchart 600 continues to module 614, which includes receiving data associated with the system to which the gateway device is coupled. The data received at module 614 can include monitored device data of the monitored and/or managed devices within the system.

The data can be received after the gateway device retrieves the data or sends a request to receive data from the system. The gateway device can retrieve the data or send a request to receive data from the system continuously or at specific times that are programmed into the gateway device. It may be noted that modules 612 and 614 have no particular order in which they must be done, and can generally be treated as occurring in parallel. To the extent there may be iterations of modules 612 and 614, the number of iterations of the modules need not be the same.

Figure 7:
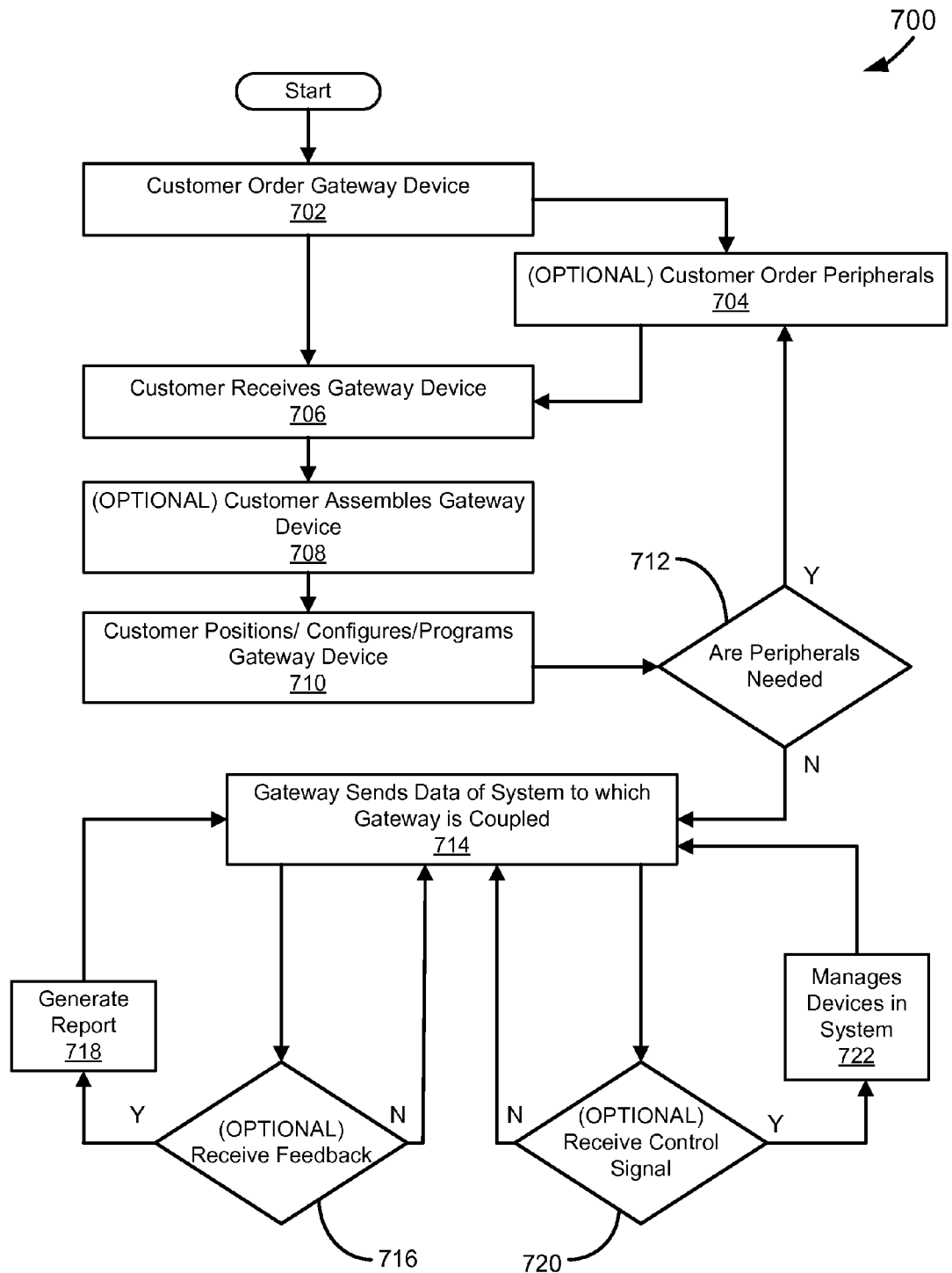
FIG. 7 depicts a flowchart of an example of a method for receiving and operating a gateway device.

FIG. 7 depicts a flowchart 700 of an example of a method for receiving and operating a gateway device. The flowchart 700 starts at module 702, which includes a customer/user ordering a gateway device.

In the example of FIG. 7, the flowchart 700 continues to optional module 704, which includes the customer ordering peripherals, including peripherals for the ordered gateway device. The peripherals can include antennas, power supplies, add-on cards or other local M2M datastores.

In the example of FIG. 7, the flowchart 700 continues to module 706, which includes the customer receiving the gateway device and the peripherals that the customer ordered.

In the example of FIG. 7, the flowchart 700 continues to module 708, which includes the customer can optionally assemble the gateway device. The step of the customer assembling the gateway device is optional in that the gateway device can be sent to the customer already assembled. For example, the gateway device can include all of the peripherals attached and coupled to the gateway device, so that the peripherals can function during the operation of the gateway device.

In the example of FIG. 7, the flowchart 700 continues to module 710, which includes the customer positioning, configuring and/or programming the gateway device. The customer can position the gateway device according to the position of the devices within the system to which the gateway device will be connected. The customer can also position the gateway device according to the way in which the gateway device will be connected to the devices within the system. For example, if the devices will be connected to the gateway device through a wireless connection, the gateway device can be positioned so that a signal with a sufficient strength is created by the gateway device to connect the devices within the system to the gateway device. In configuring the gateway device, at module 710, the customer can make all of the appropriate connections so that the devices within the system are connected to the gateway device. Configuring the gateway device can also include coupling a local M2M datastore to the gateway device. The local M2M datastore can be an add-on card that includes specific subroutines for the devices of the system that are connected to the gateway device. In programming the gateway device, at module 710, the customer can program subroutines into and store subroutines on the gateway device. The subroutines can be executed by the devices that are connected to the gateway device.

In the example of FIG. 7, the flowchart 700 continues to decision block 712, where it is determined whether peripherals are needed. What peripherals are needed may or may not be determined based on the customer positioning, configuring and/or programming of the gateway device. If it is determined peripherals are needed (712—Y), the flowchart 700 returns to module 704 and continues as described previously. If, on the other hand, it is determined peripherals are not needed (712—N), then the flowchart 700 continues to module 714, which includes the gateway device sends retrieved monitored device data of the monitored devices and the managed devices of the system. The data can be sent to an applicable engine or datastore, such as engines or datastores described in this paper.

In the example of FIG. 7, the flowchart 700 optionally continues to decision point 716 where it is determined whether feedback is received. If it is determined no feedback is received (716—N), then the flowchart 700 returns to module 714 and continues as described previously. If, on the other hand, it is determine feedback is received, the flowchart 700 continues to module 718, which includes generating a report, returns to module 714, and continues as described previously. For example, the gateway or applicable systems or engines coupled to the network can generate a report based on sent data and received feedback. In a specific implementation, the report is displayed to a user through a graphical user interface.

In the example of FIG. 7, the flowchart 700 optionally continues to decision point 720 where it is determined whether a control signal is received. If it is determined a control signal is not received, the flowchart 700 returns to module 714 and continues as described previously. If, on the other hand, it is determined a control signal is received, the flowchart 700 continues to module 722, which includes managing devices in the system, returns to module 714 and continues as described previously. For example, the gateway device can instruct the managed devices in the system to perform according to the control signal. In a specific implementation, in performing according to the control signal, the managed devices can execute the subroutines described in the control signal.

The control signal can be, for example, in response to the sending of data at module 714. The control signal can be used to manage a managed device within the system and include instructions and descriptions of subroutines to be executed by the managed devices in the system. The instructions can be received by the gateway device from a control server that is coupled to the gateway device through the network. In an alternative implementation, not shown in FIG. 7, the control signal can be generated by the gateway device itself without the sending of data, at module 714. Specifically, the gateway device can generate the control signal based on subroutines and data stored within a local M2M subroutine datastore that is either part of the gateway device or coupled to the gateway device.

While preferred embodiments of the present inventive apparatus and method have been described, it is to be understood that the embodiments described are illustrative only and that the scope of the embodiments of the present inventive apparatus and method is to be defined solely by the appended claims when accorded a full range of equivalence, many variations and modifications naturally occurring to those of skill in the art from a perusal thereof.

We claim:

1. A method comprising:
   operationally connecting a connectivity-aware customized intelligently managed gateway system to a cellular network;
   operationally connecting the connectivity-aware customized intelligently managed gateway system to a monitored system;
   determining, by the connectivity-aware customized intelligently managed gateway system, whether the connectivity-aware customized intelligently managed gateway system is connected to the monitored system;
   collecting, from the connectivity-aware customized intelligently managed gateway system through the cellular network, monitored device data of a monitored device within the monitored system, the monitored device data including status data identifying functioning of the monitored device;

managing the monitored device, by the connectivity-aware customized intelligently managed gateway system, by instructing the monitored device to execute machine to machine subroutines in performing at least one function of the monitored device from instructions for the monitored device to execute the machine to machine subroutines.

2. The method of claim 1, wherein the instructions for the monitored device to execute the machine to machine subroutines are generated by the connectivity-aware customized intelligently managed gateway system that is configured to retrieve the machine to machine subroutines from a local machine to machine subroutines datastore.

3. The method of claim 1, wherein the instructions for the monitored device to execute the machine to machine subroutines are generated by a system control server that is configured to retrieve the machine to machine subroutines from a remote machine to machine subroutines datastore, the system control server coupled to the connectivity-aware customized intelligently managed gateway system through the cellular network and sending the instructions for the monitored device to execute the machine to machine subroutines to the connectivity-aware customized intelligently managed gateway system through the cellular network.

4. The method of claim 1, further comprising:
collecting, from the connectivity-aware customized intelligently managed gateway system through the cellular network, monitored device data of a second monitored device within the monitored system;
managing, by the connectivity-aware customized intelligently managed gateway system, the monitored device including instructing the monitored device to execute machine to machine subroutines from instructions for the monitored device to execute the machine to machine subroutines, the instructions for the monitored device to execute the machine to machine subroutines generated, at least in part, based on the monitored device data of the second monitored device.

5. The method of claim 2, wherein the local machine to machine subroutines datastore is a removable datastore that contains machine to machine subroutines for a specific type of monitored device, the monitored device being the specific type of monitored device.

6. The method of claim 2, wherein the machine to machine subroutines are created by a user of the connectivity-aware customized intelligently managed gateway system and stored on the local machine to machine subroutines datastore.

7. The method of claim 1, wherein the monitored system is connected to the connectivity-aware customized intelligently managed gateway system through a connected devices interface.

8. The method of claim 7, wherein the connected devices interface is a wireless network interface and the monitored system is connected to the connectivity-aware customized intelligently managed gateway system through a wireless network.

9. The method of claim 8, wherein the monitored system is connected to the connectivity-aware customized intelligently managed gateway system through stations within the wireless network.

10. A system comprising:
a connectivity-aware customized intelligently managed gateway system connected to a monitored system including a monitored device, the connectivity-aware customized intelligently managed gateway system coupled to a cellular network and configured to determine whether the connectivity-aware customized intelligently managed gateway system is connected to the monitored system and manage the monitored device by instructing the monitored device to execute machine to machine subroutines in performing a function of the monitored device from instructions for the monitored device to execute the machine to machine subroutines;
a system monitoring server coupled to the cellular network and configured to collect monitored device data of the monitored device from the connectivity-aware customized intelligently managed gateway system through the cellular network, the monitored device data including status data identifying functioning of the monitored device.

11. The system of claim 10, wherein the instructions for the monitored device to execute the machine to machine subroutines are generated by the connectivity-aware customized intelligently managed gateway system that is configured to retrieve the machine to machine subroutines from a local machine to machine subroutines datastore.

12. The system of claim 10, wherein the instructions for the monitored device to execute the machine to machine subroutines are generated by a system control server that is configured to retrieve the machine to machine subroutines from a remote machine to machine subroutines datastore, the system control server coupled to the connectivity-aware customized intelligently managed gateway system through the cellular network and sending the instructions for the monitored device to execute the machine to machine subroutines to the connectivity-aware customized intelligently managed gateway system through the cellular network.

13. The system of claim 10, wherein:
the system monitoring server is further configured to collect, from the connectivity-aware customized intelligently managed gateway system through the cellular network, monitored device data of a second monitored device within the monitored system;
the connectivity-aware customized intelligently managed gateway system is further configured to manage the monitored device by instructing the monitored device to execute machine to machine subroutines from instructions for the monitored device to execute the machine to machine subroutines, the instructions for the monitored device to execute the machine to machine subroutines generated, at least in part, based on the monitored device data of the second monitored device.

14. The system of claim 11, wherein the local machine to machine subroutines datastore is a removable datastore that contains machine to machine subroutines for a specific type of monitored device, the monitored device being the specific type of monitored device.

15. The system of claim 11, wherein the machine to machine subroutines are created by a user of the connectivity-aware customized intelligently managed gateway system and stored on the local machine to machine subroutines datastore.

16. The system of claim 10, wherein the connectivity-aware customized intelligently managed gateway system includes a connected devices interface through which the monitored system is connected to the connectivity-aware customized intelligently managed gateway system.

17. The system of claim 16, wherein the connected devices interface is a wireless network interface, and the monitored system is connected to the connectivity-aware customized intelligently managed gateway system through a wireless network that includes stations.

18. A system comprising:
- means for operationally connecting a connectivity-aware customized intelligently managed gateway system to a cellular network;
- means for operationally connecting the connectivity-aware customized intelligently managed gateway system to a monitored system;
- means for determining whether the connectivity-aware customized intelligently managed gateway system is connected to the monitored device;
- means for collecting monitored device data of a monitored device within the monitored system, the monitored device data including status data identifying functioning of the monitored system;
- means for managing the monitored device, by the connectivity-aware customized intelligently managed gateway system, by instructing the monitored device to execute machine to machine subroutines in performing a function of the monitored device from instructions for the monitored device to execute the machine to machine subroutines.

* * * * *

UNITED STATES PATENT AND TRADEMARK OFFICE
CERTIFICATE OF CORRECTION

PATENT NO. : 9,351,181 B2  
APPLICATION NO. : 13/937583  
DATED : May 24, 2016  
INVENTOR(S) : Harold Paul Hammann et al.

Page 1 of 1

It is certified that error appears in the above-identified patent and that said Letters Patent is hereby corrected as shown below:

In the Claims

In column 23, lines 8-14,

--means for determining whether the connectivity-aware customized intelligently managed gateway system is connected to the monitored device;

means for collecting monitored device data of a monitored device within the monitored system, the monitored device data including status data identifying functioning of the monitored system;-- should be changed to:

--means for determining whether the connectivity-aware customized intelligently managed gateway system is connected to the monitored system;

means for collecting monitored device data of a monitored device within the monitored system, the monitored device data including status data identifying functioning of the monitored device;--

Signed and Sealed this  
Nineteenth Day of July, 2016

Michelle K. Lee  
*Director of the United States Patent and Trademark Office*